Nov. 16, 1965 W. G. DELP 3,218,589

FINE TUNING MECHANISM FOR TELEVISION TUNERS

Original Filed Oct. 20, 1961 5 Sheets-Sheet 1

INVENTOR.
WILLIAM G. DELP
BY
OSTROLENK, FABER, GERB & SOFFEN
ATTORNEYS

INVENTOR.
WILLIAM G. DELP
BY
OSTROLENK, FABER, GERB & SOFFEN
ATTORNEYS

FINE TUNING MECHANISM FOR TELEVISION TUNERS

Original Filed Oct. 20, 1961 5 Sheets-Sheet 3

INVENTOR.
WILLIAM G. DELP
BY
OSTROLENK, FABER, GERB & SOFFEN
ATTORNEYS

Nov. 16, 1965 W. G. DELP 3,218,589

FINE TUNING MECHANISM FOR TELEVISION TUNERS

Original Filed Oct. 20, 1961 5 Sheets-Sheet 4

INVENTOR.
WILLIAM G. DELP

BY

OSTROLENK, FABER, GERB & SOFFEN

ATTORNEYS

Nov. 16, 1965 W. G. DELP 3,218,589

FINE TUNING MECHANISM FOR TELEVISION TUNERS

Original Filed Oct. 20, 1961 5 Sheets-Sheet 5

INVENTOR.
WILLIAM G. DELP

BY

OSTROLENK, FABER, GERB & SOFFEN

ATTORNEYS

3,218,589
FINE TUNING MECHANISM FOR TELEVISION TUNERS

William G. Delp, Pasadena, Calif., assignor to Standard Kollsman Industries, Inc., Melrose Park, Ill., a corporation of Illinois Continuation of abandoned application Ser. No. 146,524, Oct. 20, 1961. This application Feb. 4, 1964, Ser. No. 343,189
18 Claims. (Cl. 334—51)

This invention relates to novel fine tuning mechanisms, particularly for television tuners, of effective, simplified and economical construction, and is a continuation of my copending U.S. patent application (B156) Serial No. 146,524 filed October 20, 1961, now abandoned, entitled "Fine Tuning Mechanism for Television Tuners."

The band-width of television channels is six megacycles. There are twelve VHF channels, which generally are tuned-in through individual or discrete steps. The common circuit sections of the tuner are thereby altered to tune to the desired channel frequency band. As the requisite oscillator frequencies for the signal heterodyning should be close to predetermined values, a common manual fine tuning element has generally been provided for this purpose. However, whenever such element is adjusted for one channel, it upsets the setting for the others.

Recently, relatively complex twelve-position camming devices have been introduced to avoid such resettings, utilizing individual presettable fine tuning cams for the channel selection positions of the tuner. Their utility has been particularly indicated in motorized remote tuning television receivers. Permitting individual channel fine tuning through external adjustment by a single knob, troublesome retuning of the other channels was avoided. However, the added weight, cost, space, and mechanical vulnerability of such devices have limited their general use in television receivers.

In accordance with the present invention, a single control disc or pinion is operated through the external fine tuning knob, to selectively operate the individual oscillator coil slugs directly for precisely tuning all the television channels. The control disc or pinion is rotatable in either direction, to effect fine longitudinal adjustments on any engaged slug, and thereby precisely tune the circuit for the selected channel.. Upon manual release of the knob, internal resilient biasing of the invention device directly disengages the aforesaid control mechanism. The oscillator slugs are thus retained in their individual settings, for normal tuning-in operations by the tuner. Should any channel later require retuning, its presettable oscillator slug is directly reset simply by turning the fine tuning knob. Visual observation of this operation is available on the screen, as precise tuning presetting occurs with best picture reception.

The invention preset fine tuning mechanism is simple in construction, contains relatively few parts, and is rugged. Its compactness and economy make it practical for general television use. The preferred application is to directly control any of the oscillator coil slugs of the tuner, and thus eliminate the need for a common fine tuning impedance as heretofore employed.

According to one embodiment of my invention, the oscillator slugs are in the form of threaded metal members or screws, each having a transverse head formed as a gear member. Said slug gear members are individually engageable with a cooperating gear driven by the preset tuning shaft control knob. The threaded gears are preferably arranged to harmlessly slip in their mounting at their end positions so as to prevent damage or freezing thereof.

According to another embodiment of my invention, the oscillator slugs have a coupling member secured at their head, engageable by a cooperating drive coupling member for axial rotation thereof. Said coupling members may, for example, be male, female hexagonal members, normally spaced apart, but brought into engagement by actuation of the preset tuning shaft.

It is accordingly a primary object of the present invention to provide a novel fine-tuning mechanism, individually presettable in tuners with discretely tuned television channels.

Another object of this invention is to provide a novel presettable fine tuning mechanism of simplified and rugged construction.

A further object of this invention is to provide novel presettable fine tuning mechanism of direct and precise operation; and directly disengaged when the external knob is released through internal biasing.

It is still another object of this invention to provide novel presettable fine tuning in a manner that inherently avoids damage to the oscillator slugs or freezing of the mechanism at the end positions of the slugs.

Still a further object of this invention is to provide a novel presettable fine tuning mechanism, wherein the drive and slug driven means are normally spaced apart along a common axis, with biasing means establishing such a spaced apart relationship corresponding to release of the fine tuning shaft control.

Still an additional object of this invention is to provide such a presettable fine tuning arrangement which includes a slip clutch cam mechanism for axially translating the drive means into engagement with a selectable one of the slug driven means.

These and other objects of this invention will become more apparent from the following description of exemplary embodiments thereof, illustrated in the drawings, in which.

Figure 1:
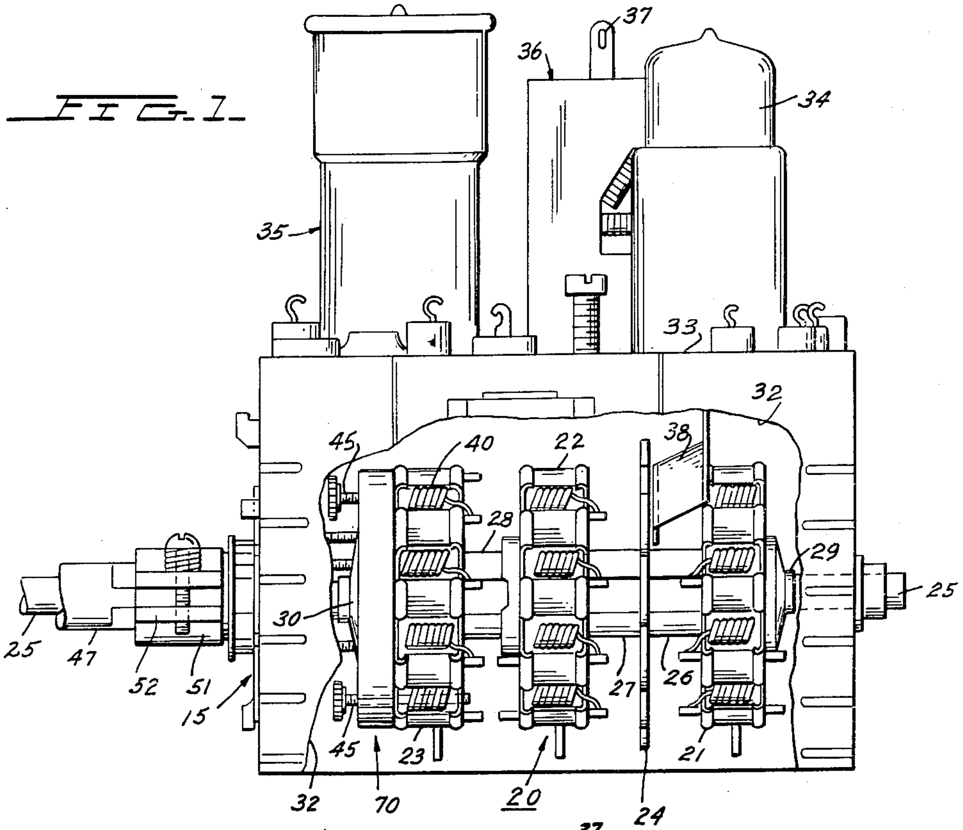
FIGURE 1 is a side elevational view, partially cut-open, of a VHF tuner incorporating one form of a preset fine tuning mechanism in accordance with the invention principles.
Figures 8, 8A, 9, 9A, 10:
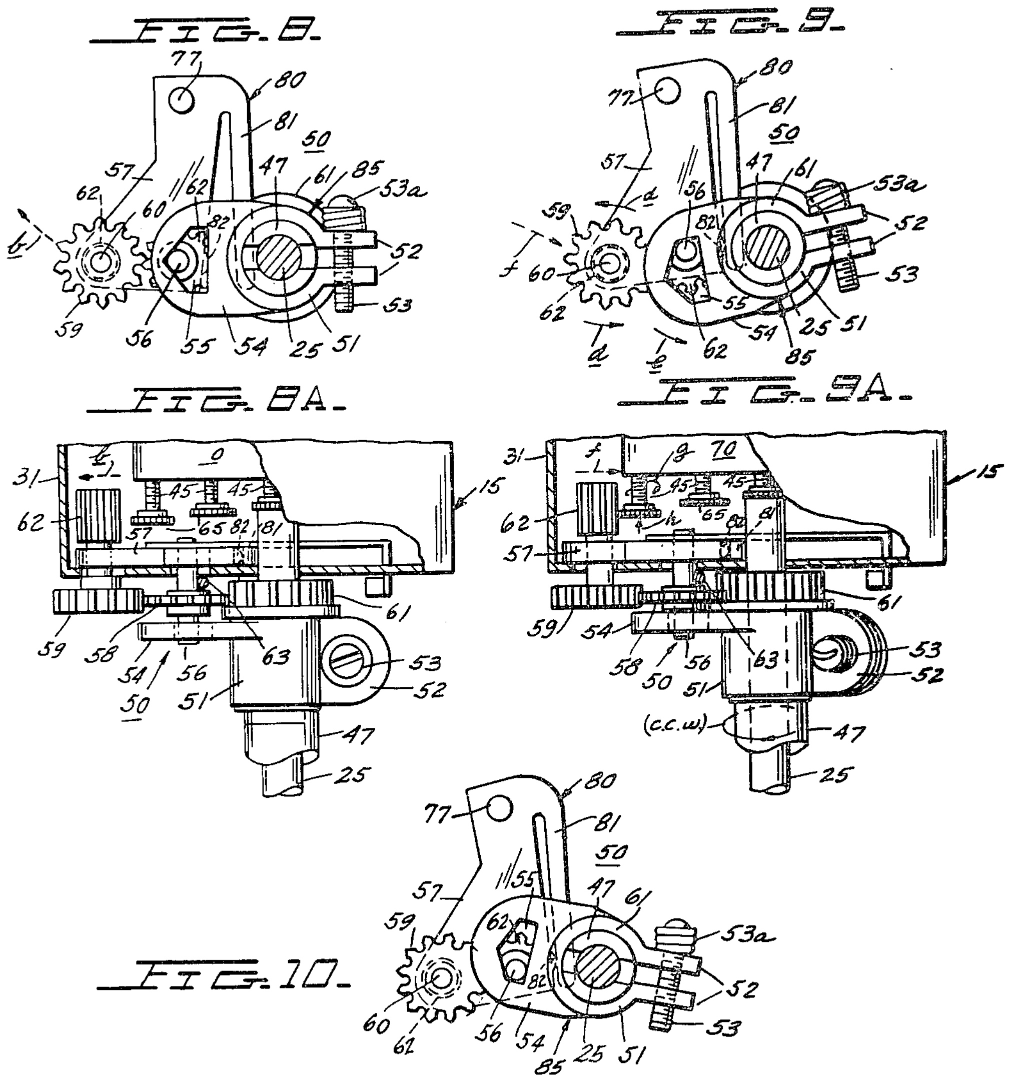
Figure 10A:
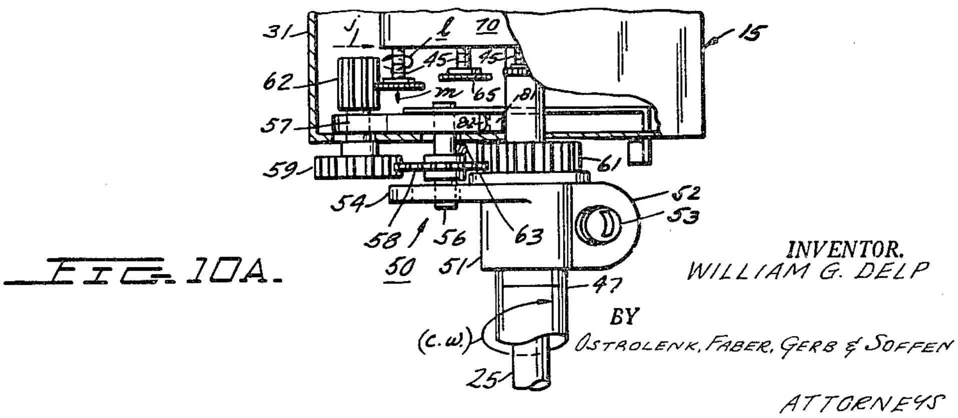

FIGURES 8 and 8*a* are respective elevational and plan views of the preset mechanism of FIGURE 1, in the neutral position; FIGURES 9 and 9*a*, in the counterclockwise knob fine tuning mode; FIGURES 10 and 10*a*, in the clockwise mode.

Figure 11:
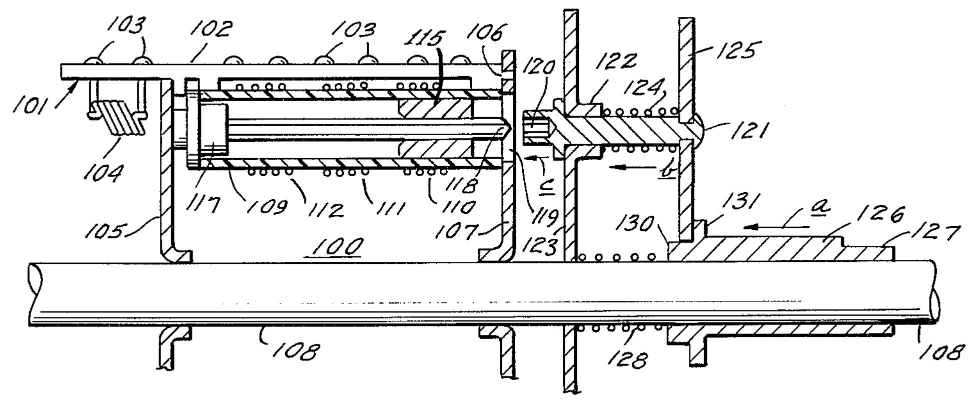

FIGURE 11 is a longitudinal cross-sectional view through a portion of a VHF television tuner embodying a further basic form of the invention preset fine tuning mechanism.

Figure 12:
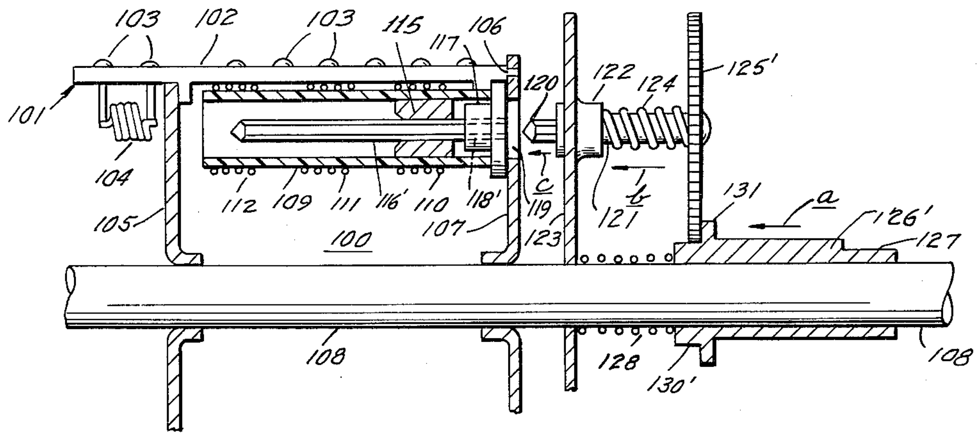

FIGURE 12 shows partially modified form of the FIGURE 11 embodiment.

Figure 13:
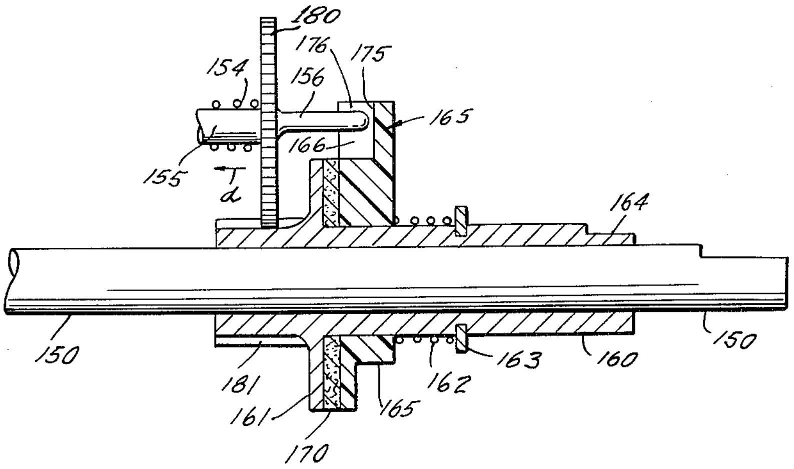

FIGURE 13 is a cross-sectional view through a modified preset control mechanism for the FIGURE 11 and 12 tuners.

Figure 14:
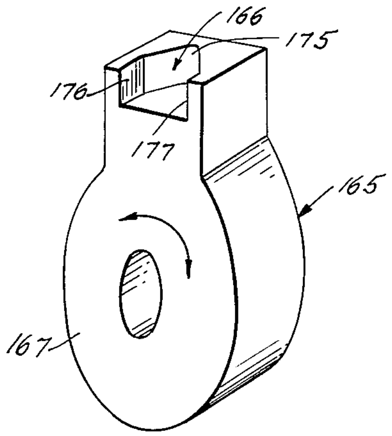

FIGURE 14 is an enlarged perspective illustration of the cam-slip-clutch member of the FIGURE 13 control mechanism.

Figure 2:
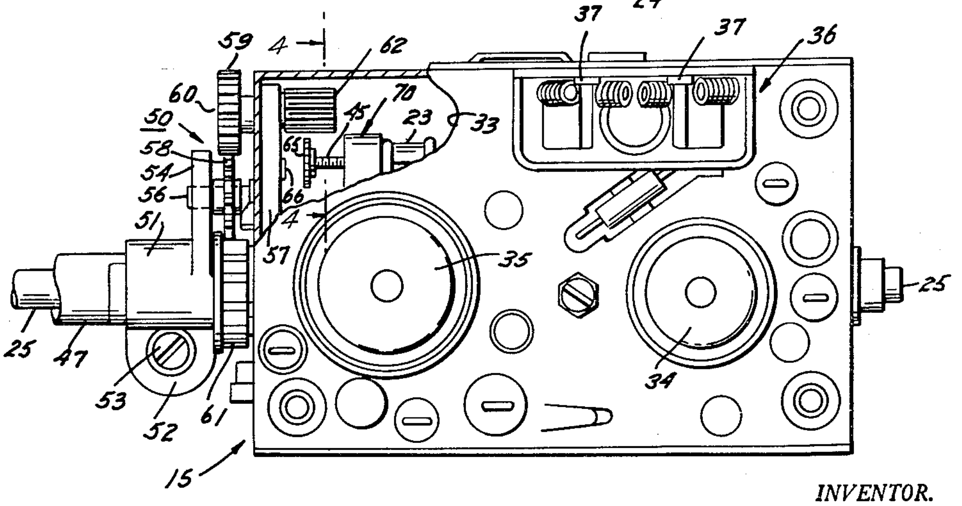
FIGURE 2 is a plan view of the tuner of FIGURE 1, with a corner cut-open, showing the fine tuning mechanism portion therein.
Figure 3:
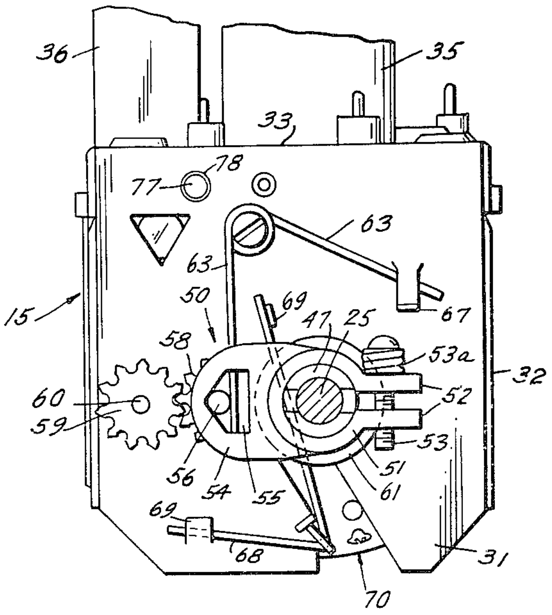
FIGURE 3 is an end view of the tuner of FIGURES 1 and 2, showing in face view the fine tuning mechanism.

The VHF television tuner, illustrated in FIGURES 1, 2 and 3, incorporates a production version of the present invention, selectively presetting the tuner oscillator slugs by external manual operation of the fine tuning shaft.

Tuner 15 contains twelve discretely tuned circuits, one for each of the selectable VHF channels. Each tuned circuit includes an adjustable oscillator coil section. The oscillator frequency for the particular channel is adjusted through manual rotation of a threaded metal slug or screw within the oscillator coil, longitudinally locating it for precise tuning. A desirable though optional thread biasing feature, as set forth in my copending U.S. patent application (B152) Serial No. 112,957 filed May 26, 1961 entitled Integrally Biased Tuning Slug Retainer and assigned to the assignee of the instant invention, permits such individual adjusting of each threaded slug and firmly holds each slug or screw in its desired setting.

The rotatable drum 20 of the tuner 15 is composed of the RF or input coil disc assembly 21, the interstage coil disc assembly 22, and the oscillator coil disc assembly 23. The RF coil disc assembly 21 is electrostatically shielded from disc assemblies 22, 23 by metal detent disc 24. The coil disc assemblies 21, 22 and 23, together with detent disc 24, are suitably mechanically secured to the control or selector shaft 25, for rotation in unison. Integral spacers 26, 27 and 28 maintain the respective disc assemblies in predetermined axial position. End spring washers 29, 30 hold the rotor assembly 20 intact. The disc assemblies 21, 22, 23 mechanically interlock, and contain the individual inductors or coils for the channels.

The VHF tuner 15 is constructed as a box-framed chassis 31, with a removable external shield 32. The usual stationary circuit components are mounted to the top plate 33, as are the RF amplifier tube 34, and mixer-oscillator tube 35. The antenna input coupling network 36 extends above plate 33 for connection through terminals 37, 37 to an external antenna. A fixed arcuate shield 38 (see FIGURE 1) depends from top plate 33, and separates the upper region between the RF and interstage disc assemblies 21, 22. In this way, the RF stage circuitry is shielded from the interior interstage and oscillator signals, for stability at high gain, and reduced radiation.

The oscillator disc assembly 23 contains an individual coil 40 for each VHF channel to be tuned. Each selector shaft 25 position circuitally connects an oscillator coil 40 and the associated interstage and antenna coils with the stationary tuner circuitry, as is understood by those skilled in the art. Each oscillator coil 40 is oriented longitudinally, with a threaded metal member 45 operable therein. The metal members or slugs 45, 45 are used to adjust the inductance value of the associated oscillator coil, and its frequency determination for the channel tuning. Such adjustment is presettable individually, in operation through external manual control by the fine tune control mechanism 50.

The preset fine tuning device 50 is located at the tuning control end of tuner 15. A slip-clutch 51–52 is coupled to the fine tune hollow shaft 47. The slip-clutch is formed by a collar 51 with an extending integral yoke 52 mounted on shaft 47 with a cross-screw 53. The screw 53 has a helical spring **53*a* to maintain a predetermined tension in the screw setting. The collar is of plastic material, and serves as the slip-clutch on shaft 47. A transverse cam element 54 contains a cam-slot 55 engageable with a pin 56 extending from a resiliently pivoted plate 57. Plate 57 supports idler gear 58 on integral pin 56, and driven gear 59 on shafts 60 (see also FIGURES 5 and 6). The slug control pinion 62 is secured on the interior end of shaft 60**.

A drive gear 61 is secured with fine tune shaft 47, and operates idler gear 58 in either rotational direction. This, in turn, drives gear 59 to correspondingly rotate control pinion 62 in either direction. Pinion 62 is selectively engageable with the head gears 65 at the outer end of each threaded slug member 45. The channel selected for tuning-in, through control shaft 25, also locates its slug 45 and associated head gear 65 in engageable relation with preset pinion 62. Pinion 62 is normally held biased away from engagement. When, however, the fine tune preset shaft 47 is rotated in either direction, slip-clutch 51 is turned to correspondingly displace pin 56 and so holds pin 56 on either end of cam slot 55 during the fine tuning operation, in a manner to be described in detail hereinafter.

The cam slot 55 is cammed to move the biased spring biased pinion 62 assembly with plate 57 into engagement with the head gear 65 then opposite it (see FIGURES 9*a* and 10*a*). Slip-clutch 51 thereupon slips on the fine tune shaft 47, and drive gear 61 turns idler 58, driven gear 59, control pinion 62, and in turn the engaged head gear 65 with its threaded slug member 45. Operation of fine-tune shaft 47 in either direction correspondingly effects directional movement of the threaded slug 45 longitudinally of its associated oscillator coil 40.

In this manner the oscillator setting for any particular channel is adjusted, precisely, through external operation of hollow fine-tune shaft 47. Release of shaft 47 results in pin 56 being positively returned, to the center of cam slot 55, and in biased pinion 62 being directly disengaged from any slug head gear 65. Normal channel selection may thereupon proceed without any oscillator head gear 65 abutting the control pinion 62 or any other portion of preset mechanism 50. The threaded oscillator slugs 45, 45 are firmly retained in a composition ring 70, at their last preset positions. The precise tuning settings are thus maintained, and are individually readily resettable.

A wire spring with two arms 63, 63 is pivotally mounted to pin 64 of the chassis wall, with one arm 63 latched to a wall knock-out 67. The free arm of spring wire 63 is pressed against pin 56, as shown in FIGURE 3, to normally bias it radially outwardly, and thereby held engaged with the triangular apex of cam 54 when thus in the neutral mode. This action normally holds plate 57 and control pinion 62 therewith away from the slug head gears 65, as shown in FIGURES 8 and 8*a*. A second wire spring 68 is held between knock-outs 69, 69 and biases the control shaft 25 in its end chassis mount.

The annular slug retaining ring 70, while utilized in the tuner 15 embodiment, may be replaced by equivalent slug 45 mounts, as the preset fine tuning mechanism 50 hereof is applicable generally to parallel, longitudinally displaceable slug members. The particular multiple slug mount 70 illustrated is described in detail in copending patent application Serial No. 112,957 referred to hereinabove. The ring 70 mounts the threaded slugs 45, 45 at their co-operative positions with the associated oscillator coils 40, as shown in FIGURES 1 and 2.

Slug mounting ring 70 retains the threaded slugs 45, 45 against displacement after setting; permits their ready resetting with reasonable torque application; and effects slippage in their thread retention when at either end of their axial positions or stroke. A limit stop for the outward travel of head gear 65 is provided, as for example by a projecting portion 66 of plate 57, in the exemplary manner shown in FIGURE 2. When head gear 65 abuts stop 63, further turning thereof merely causes slug 45 to slip in the mounting 70, as more fully discussed in aforementioned copending patent application Serial No. 112,-957.

Figure 4:
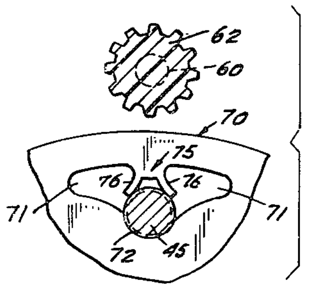
FIGURE 4 is an enlarged partial view of the oscillator slug retainer ring, taken along the line 4—4 of FIGURE 2.

FIGURE 4 is an enlarged view of a single mount section of the ring 70. At each channel position is located a transverse cavity 71 incorporating a central arcuate portion 72 and an opposed integral retainer channel 75 between which a threaded slug 45 is engaged. The channels 75 each contain two tongues or fingers 76, 76 extending at an acute angular relation. The spacing of the channel 75 from portion 72; the angular extent of fingers 76, 76; their relative thickness, hence resilience; the nature of the material used; and the curvature of portion 72 all combine to determine the effectiveness of the grip on a slug 45 held therebetween.

The effective torque desired to operate or turn the threaded slugs 45 in their retainer cavities 71 determines these particular relationships, in its construction. A suitable resilient plastic material is used for ring 70. Basically, the size of each cavity 71, channel 75, and fingers 76, 76 are relatively small for typical threaded oscillator slugs 45. In the exemplary tuner 15 the outer diameter of the threaded screw 45 was one-sixteenth of an inch. The radial extent of the tongues 76, 76 for their mounting was of the order of one-thirty-second of an inch. With the axial thickness of ring 70 at three-eighths of an inch, excellent retention, biasing and torque characteristics result.

An important advantage of the annular retainer structure 70 is the ready insertion of the threaded slugs 45 into the respective retainer-cavities 71. This is accomplished by simply axially sliding or pressing each slug 45 between the channel 75 and the arcuate portion 72. No internal threading of the tongues 76 or portion 72 is required. The resilient composition material, and the resilient pressure along the fingers 76, 76 on the threaded member 45, accomplishes its retention. Further, and equally important, is the axial displacement such retention permits upon the rotation of the threaded body of the slugs 45, in either direction, in the same manner as though the channel 75 and portion 72 were internally threaded.

The fingers 76, 76 are spread apart from their neutral position to create the retention force or bias along the slugs 45 therein. The slug 45 is pressed against the arcuate portion 72 and thereby firmly gripped in the cavity 71. Thus, the slugs 45 are pressed into their cavity retainers by simple production mechanism. Once in, they are firmly retained, yet are readily displaced axially by rotation. Such displacement in either longitudinal direction is effected through the head gear 65 on the slug's external end, through fine tuner shaft 47 and the mechanism 50, as described hereinabove.

Further, when the individual slugs 45 are preset in their precise tuning positions through mechanism 50, the retainer 70 construction maintains and firmly grips the slugs 45 despite extremes encountered as to vibration, tuner operation, temperature change, and the like. When any slug member 45 reaches either end of its stroke, as for example when slug 45 is moved to its extreme left position (FIGURE 2), head gear 65 abuts stop 66, therefore slug 45 cannot travel further to the left axially. Therefore, further rotation of the slug 45 simply results in its slipping. Upon rotation in the opposite direction, the member is thereupon directly moved axially away from such stroke end. No damage to the retainer 70 occurs, and the slugs 45 return to their normal presetting function.

Figure 5:
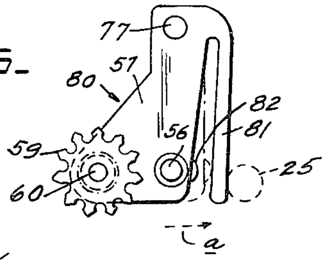
FIGURE 5 is a side view of the control pinion assembly of the FIGURE 1 tuner preset mechanism.
Figure 6:
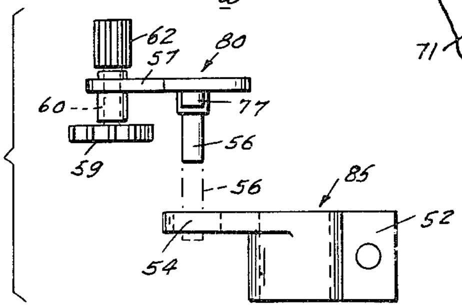
FIGURE 6 is a separated plan view of the control pinion assembly of FIGURE 5, and its associated slip-clutch-cam member.

The control pinion assembly 80 is more clearly seen in FIGURES 5 and 6. The mounting plate 57 contains a stub 77 which serves as a pivot for the assembly 80 in operation. Stub 77 is set into aperture 78 in the end chassis wall 31, as seen in FIGURES 2 and 3. A finger 81 extends from the pivotal end of plate 57, and coacts with a stop 82 projecting from plate 57. Proportioning of finger 81 and stop 82, determines the extent of pivotal displacement of the assembly 80.

Figure 7:
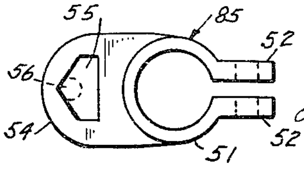
FIGURE 7 is a face view of the slip-clutch-cam member of FIGURE 6.

Finger 81 is mounted so as to be juxtaposed with selector shaft 25, as seen in FIGURES 8, 9, 10. Displacement of pin 56 of assembly 80 in the control operations, as will be described, swings the control pinion 62 into engagement with a slug head-gear 65; see FIGURES 9*a*, 10*a*. Should closer meshing with gears 65 be required in particular tuners in production, shaving down stop 82 readily affords such adjustment. The components of the control pinion assembly 80 are advantageously molded of tough, resilient plastic material. Similarly, the unitary slip-clutch-cam member 85, shown separately in FIGURES 6 and 7, is preferably molded.

FIGURES 8 and 8*a* illustrate the preset fine tune mechanism in its neutral mode. Station selection is performed by simply rotating shaft 25 to the corresponding angular position. The head-gears 65 of slugs 45 do not touch the outwardly displaced control pinion 62. With fine tune shaft not manipulated, wire spring 63 presses pin 56 radially outwardly. Pin 56 resets in the apex of cam 54, at its outermost radial extent. The plate 57 of control pinion assembly 80 is thereupon pivoted outwardly, on stub 77, in the direction of arrows *b, b*. The control pinion 62 is thus safely displaced from interfering with the gears 65, 65 during channel selection. The slugs 45, 45 are retained in their previously optimized positions.

FIGURES 9 and 9*a* illustrate the fine tune control operation for the C.C.W. rotational direction of fine tune shaft 47. Driven gear 59 is thereby also turned C.C.W., per arrows *d, d*. Simultaneously, member 85 is turned partially in direction *a* until pin 56 engages the upper part of its cam 54 in cam slot 55. The upper inclined cam surface thereupon forces pin 56 and the movable portion of assembly 80 radially inwards (towards shaft 25), as indicated by arrows *f, f*. This results in control pinion 62 engaging with the head-gear 65 for the oscillator coil of the channel positioned in the circuit.

The slug 45 thereof, is concurrently rotated in the C.W. direction, per *g*, and correspondingly displaced longitudinally in its associated coil. The thread direction of slugs 45 determines whether it is moved inwardly or outwardly; but in any event, the oscillator frequency is changed at a desired rate for angular turning of shaft 47. The sense of the frequency change is also predetermined in a given construction, in accordance with the C.C.W. or C.W. turning of shaft 47, as is understood by those skilled in the art. The C.W. rotation of slug 45 in the exemplary tuner 15 motivates it inwardly of the associated oscillator coil, as indicated by arrow *h*.

FIGURES 10 and 10*a* illustrate the action of control mechanism 80 for the C.W. rotational direction of shaft 47. Assembly 85 is turned C.W. per *i*, but stopped by pin 56 at the bottom of cam slot 55. Further rotation of shaft 47 causes clutch 51–52 to slip thereon. The pin 56 draws plate 57 inwards, per arrows *i, i*, whereupon control pin 62 engages with the positioned head gear 65. Driven gear 59 and pinion 62 are rotated C.W. through drive gear 61, and in turn drives positioned gear 65 in the C.C.W. direction per *l*. The slug 45 is therey displaced in the opposite or outward longitudinal direction, as indicated by arrow *m*, and fine tuning, in the opposite sense to that of FIGURE 9*a*, is performed. Upon release of shaft 47, the control pinion 62 is directly disengaged from the gear 65, and safely displaced automatically to its neutral position, as described in connection with FIGURES 8 and 8*a* hereinabove.

FIGURE 11 is a cross-sectional view through one channel selection section of another version of this invention. The tuner 100 is a VHF drum or turret type containing an individual panel 101 for each channel. The panels 101 are composed of composition coil boards or strips 102 with contact pins 103 therethrough. An antenna coil 104 extends on the end, beyond metallic disc 105 that serves as a panel end mount and electrical shield. The other panel end 106 is engaged with a slot in the drum end plate 107.

The drum plates or discs 105, 107 are firmly secured to the central control or selector shaft 108 for rotation of the drum to the desired channel angular orientation, for connection of the corresponding coil contact pins 103, 103 to the stationary contactors in a well known manner. A typical drum type tuner is shown in Patent No. 2,975,276 of March 14, 1961 for "Frequency Selector."

There are three coils on the panel mounted coil form

109. These are the oscillator coil 110; the mixer coil 111; and the radio frequency amplifier output coil 112. The coils are respectvely connected to their panel contacts 103. In accordance with this invention, the metallic tuning slug 115 for the oscillator coil 110 is arranged within the coil form 109 on a central driver rod or pin 116. Central rod 116 is of plastic or composition material, preferably of hexagonal cross-section.

The slug 115 is cylindrically fitted in form 109 for transverse displacement. Slug 115 has a central hexagonal hole that coacts with the hexagonal shaft 116. Shaft 116 extends from a cylindrical captivation member 117 at the opposite end of form 119, and serves as a floating slug 115 driver. The slug end 118 of shaft 116 projects to that of form 109, and terminates in a male hexagonal form at an aperture 119 in plate 107, thereat.

The hexagonal floating slug driver 116 is thus held captive endwise by member 117, and is free to rotate. Driver 116 is rotatable through the adjacent female hexagonal coupling 120, operable from outside the tuner and television receiver in a manner to be described. Rotation of driver 116 and of slug 115 therewith results in axial translation or displacement of the slug 115 in coil form 109. Slug 115 is thereby controllably displaced in either axial direction with respect to oscillator coil 110 stationary on form 109, through corresponding direction of rotation of the driver 116. Means for causing slug 115 to be axially displaced in coil form 109 are understood by those skilled in the art.

The hexagonal coupling 120 extends from the driver coupling shaft 121 rotatably supported at boss 122 in frame 123 of the tuner chassis. A gear or disc 125 is secured to the tip of shaft 121. A helical spring 124 stabilizes the disc 125 as a driven assembly with shaft 121 and coupling 120 on frame 123. A hollow shaft or sleeve 126 is concentric over selector shaft 108, and is the preset fine tuning shaft. A helical spring 128 normally biases sleeve 126 outwardly, whereby the preset tuning device is held disengaged.

When fine tune shaft 126 is pushed along shaft 108, inwardly of the tuner 100 to the left per arrow *a*, against spring 128, the end 130 of shaft 126 is frictionally engaged with the peripheral surface of disc 125. An extending flange 131 on shaft 126 also presses on disc 125, displacing it in the direction of arrow *b*. Disc 125 thereupon presses shaft 121 and hexagonal coupling 120 against spring 124, to the left into tuner 100, in the direction of arrow *c*.

Thus, drive coupling 120 is engaged with the end 118 of driver shaft 116 when the sleeve 126 (with knob mounted at flat 127) is pressed in the direction of arrow *a*, inwardly. Rotation of fine tune preset shaft 126 in either direction, while thus pressed-in, effects simultaneous corresponding rotation of hexagonal slug driver shaft 116. Controlled axial displacement is thereby accomplished for the fine tuning slug 115 and in turn for the selected channel oscillator and signal tuning, as will now be understood by those skilled in the art. Release of sleeve 126 results in compressed springs 124, 128 to reestablish the disengaged relation, and coupling 120 is removed from tip 118. The slug 115 is held in its preset tuned position.

In FIGURE 12 a modified form of the tune control device of FIGURE 11 is illustrated. The disc 125 is replaced by a gear 125′, and a coacting drive gear 130′ at inner end of sleeve 126′. The alternative form for the hexagonal slug driver 116 is used herein, with a female hexagonal tip 118′ coacting with a male hexagonal coupling 120′. The operation of the FIGURE 12 tune device is otherwise identical to that of FIGURE 11, and results in the same presetting of the individual oscillator slugs 115. In both cases, the presetting engagement is effected by manually pressing-in the fine tune sleeve and simultaneously rotating the sleeve to correspondingly displace the selected oscillator slug 115 for the frequency alteration.

FIGURES 13 and 14 represent a further form of the present invention, shown applicable to the turret or drum-type of VHF tuner as per FIGURES 11 and 12. It is of course understood that the principles of this invention are usable for other tuner forms, such as the disc type 15 described hereinabove, and for the well known wafer type as well. The central selector shaft 150 is connected to the rotatable tuning drum, disc or wafer rings, as desired. The driver coupling shaft 155 is extendable longitudinally for engagement with the hexagonal floating slug driver shaft (or equivalent) of the selected channel panel, in the manner of the FIGURES 11 and 12 tuners.

A coupling tip, not shown, on coupling shaft 155 effects the slug presetting engagement when shaft 155 is displaced to the left, in the direction of arrow *d*, against helical biasing spring 154. Rotation of the driver shaft 155, in either direction, thereupon operates the engaged slug driver shaft to correspondingly preset the slug for precise tuning. The axial displacement and rotation of the presetting driver or control shaft 155 is accomplished herein without requirement of axial displacement of the fine tune shaft 160.

The driver coupling shaft 155 contains an extension portion 156 in cooperative engagement with the cam region 166 of friction cam plate 165. The inner plane surface 167 of cam plate 165 is pressed into frictional arrangement with friction plate 170, in turn juxtaposed with an integral disc or flange 161 of sleeve 160. A helical biasing spring 162, positioned by snap ring 163, maintains a suitable clutching slip pressure among the face plates 161, 170 and 167.

The cam region 166 contains a central neutral or remote cavity 175, corresponding to the disengaged mode for the driver coupling shaft 155. This mode prevails when no manual torque or turning is applied to the sleeve 160, as through a control knob, not shown, attached thereto at flat 164. The first few degrees of rotation in either direction of sleeve 160 rotates the slip clutch array 161, 170, 165, rotating the cam plate 165 in the corresponding direction. This results in the cam region 166 pressing shaft extension 156 inwardly of the tuner, in the direction of arrow *d*. When either end stop 176, 177 thus contacts extension 156, the cam plate 165 thereupon slips on friction plate, and permits the sleeve 160 to continue being rotated while plate 165 holds its engaged angular position. The driver coupling shaft 155 remains engaged with the slug driver shaft as sleeve 160 is thus further rotated.

The gear 180 secured with shaft 155 is rotated in a corresponding direction through spline or gear surface 181 of sleeve 160. The engaged driver shaft 155 in this mode operates the slug drive shaft of the selected channel, to preset its tuning as will now be understood by those skilled in the art. The presetting control disengages to the neutral mode upon manual release of sleeve 160. Its operation is seen to directly correspond to the preset control device of the above-described tuner 15.

Although, in the foregoing specification, the instant invention has been described in conjunction with preferred embodiments, many variations and modifications will now become apparent to those skilled in the art, and it is preferred, therefore, that this invention be limited not by the specific disclosure contained herein but only by the appended claims.

What is claimed is:

1. A television tuner having a plurality of channel selection positions individually selectable through rotation of the channel selector shaft, an oscillator coil arranged at each of said channel positions for tuning of the associated tuner channel circuitry, a slug for each of said coils arranged concentrically about the axis of said selector shaft and mounted for adjustable inductive coaction with its associated coil, said slugs being individually longitudinally displaceable along a path parallel to said selector shaft axis, a gear affixed to each of said slugs extending transversely thereof at the exterior end thereof, a preset fine tuning mechanism selectively engageable with individual ones of said slug affixed gears for individually adjusting the fine tuning position of said slugs with their respective coils, said mechanism including a preset fine tuning shaft, a control gear driven by said preset tuning shaft and engageable with the respective slug gear of the coil positioned for the selected channel, said mechanism directly operated by said preset tuning shaft for rotating said control gear and engaging it with the positioned slug gear in either rotational direction and thereby controllably displace the slug of the positioned coil in either longitudinal direction, said mechanism including biasing means for normally holding said control gear disengaged from said slug gear while said tuning shaft is released, whereby the tuner channel circuits are held tuned corresponding to the slug positions preset through said tuning shaft and mechanism and channel selection by said selector shaft is unhindered thereby, said mechanism including a slip clutch coupled to said tuning shaft and a cam controllably displaced by said slip clutch and containing an internal cam surface, a cam follower coactable with said cam surface and operatively connectable to a plate, said plate carrying said control gear in engageable relation with said slug gear, said plate being mounted on the tuner in pivoted relation.

2. A television tuner having a plurality of channel selection positions individually selectable through rotation of the channel selector shaft, an oscillator coil arranged at each of said channel positions for tuning of the associated tuner channel circuitry, a slug for each of said coils arranged concentrically about the axis of said selector shaft and mounted for inductive coaction with its associated coil, said slugs being individually longitudinally displaceable within said coil along a path parallel to said selector shaft axis, a gear affixed to each of said slugs extending transversely thereof at the exterior end thereof perpendicularly to said axis, a preset fine tuning mechanism selectively engageable with individual ones of said slug affixed gears for individually adjusting the fine tuning position of said slugs with their respective coils, said mechanism including a preset tuning shaft concentric with said selector shaft, a control pinion driven by said preset tuning shaft and engageable with the respective slug gear of the coil positioned for the selected channel, said mechanism operated by said preset tuning shaft for rotating said control pinion and engaging it with the positioned slug gear in either rotational direction and thereby controllably displace the slug of the positioned coil in either longitudinal direction, said mechanism including biasing means for normally holding said control pinion from said slug gear while said tuning shaft is released, whereby the tuner channel circuits are held tuned corresponding to the slug positions preset through said tuning shaft and mechanism and channel selection by said selector shaft is unhindered thereby, said mechanism including a slip clutch coupled to said tuning shaft and a cam extending from said slip clutch and containing a cam surface, a cam follower coactable with said cam surface and operatively connectable to a bracket, said bracket mounting said control pinion in engageable relation with said slug gear, said bracket being mounted on the tuner in displaceable relation.

3. A television tuner as claimed in claim 1, in which said cam follower extends from said plate into the internal cam surface, said biasing means normally resiliently biasing said plate radially outwardly with respect to said selector shaft and said cam follower to the neutral cam surface position, said cam surface being proportioned to displace the cam follower and bring said control gear into driving engagement with said slug gear against the biasing means held upon rotation of said tuning shaft in either direction.

4. A television tuner as claimed in claim 2, in which said cam follower extends from said bracket to the cam surface, said biasing means normally resiliently biasing said bracket outwardly with respect to said selector shaft and said cam follower to the neutral cam surface position, said cam surface being proportioned to displace the cam follower and bring said control pinion into driving engagement with said slug gear against the biasing means held upon rotation of said tuning shaft in either direction.

5. A television tuner having a plurality of channel selection positions individually selectable through rotation of the channel selector shaft, reactance element arranged at each of said channel positions for tuning of the associated tuner channel, a slug for each of said reactance elements mounted for adjustable coaction with its associated reactance element, said slugs being individually displaceable, driven means affixed to each of said slugs, a preset tuning shaft for individually adjusting the tuning position of said slugs with their respective reactance coils, drive means engageable with the respective slug driven means of the reactance element positioned for the selected channel, and mechanism operated by said tuning shaft for rotating said drive means and engaging it with the positioned slug driven means in either rotational direction and thereby controllably displace the slug of the positioned coil, said mechanism including biasing means for normally holding said drive means disengaged from said slug driven means while said tuning shaft is released, whereby the tuner channel circuits are held tuned corresponding to the slug positions preset through said tuning shaft and mechanism, said mechanism including a clutch coupled to said tuning shaft and a cam motivated by said clutch and containing a cam surface, a cam follower coactable with said cam surface, and a member carrying said drive means in engageable relation with said slug driven means, said member being mounted on the tuner in displaceable relation, said cam follower extends from said member to the cam surface, said biasing means normally resiliently biasing said member outwardly with respect to said selector shaft and said cam follower to the neutral cam surface position, said cam surface being proportioned to displace the cam follower and bring said drive means into driving engagement with said slug driven means upon rotation of said tuning shaft in either direction, said mechanism further includes gearing for coupling said tuning shaft and said drive means to controllably rotate said drive means and thereby operate said slug driven means to preset the positioned channel reactance element tuning, said gearing comprising a drive gear operated by said tuning shaft and an idler gear supported on said member for driving engagement with said drive gear selectively in either direction upon displacement of said cam follower by said cam surface and the corresponding displacement of said member upon the tuning shaft rotation in the corresponding direction.

6. A television tuner having a plurality of channel selection positions individually selectable through rotation of the channel selector shaft, coil arranged at each of said channel positions for tuning of the associated tuner channel circuitry, a slug for each of said coils arranged about the axis of said selector shaft and mounted for adjustable inductance coaction with its associated coil, said slugs being individually longitudinally displaceable, gear means affixed to each of said slugs at the exterior end thereof, a preset tuning shaft for individually adjusting the tuning position of said slugs with their respective coils, drive gear means engageable with the respective slug gear means of the coil positioned for the selected channel, and mechanism coupled to said preset tuning shaft for rotating said drive gear means and engaging it with the positioned slug gear means in either rotational direction and thereby controllably displace the slug of the positioned coil in either longitudinal direction, said mechanism including biasing means for normally holding said drive gear means disengaged for said slug gear means while said tuning shaft is released, whereby the tuner channel circuits are held tuned corresponding to the slug positions preset through said tuning shaft and mechanism and channel selection by said selector shaft is unhindered, said mechanism including a clutch coupled to said tuning shaft and a cam extending from said clutch and containing a cam surface, a cam follower coactable with said cam surface, and a member mounting said drive gear means in engageable relation with said slug gear means, said member being mounted on the tuner in movable relation, said cam follower extends from said member to the cam surface, said biasing means normally resiliently biasing said member outwardly with respect to said selector shaft and said cam follower to the neutral cam surface position, said cam surface being proportioned to displace the cam follower and bring said drive gear means into driving engagement with said slug gear means upon rotation of said tuning shaft in either direction; gearing for coupling said tuning shaft and said drive gear means to controllably rotate said drive gear means and thereby operate said slug gear means to preset the positioned channel coil tuning, said gearing comprising a drive gear operated by said tuning shaft and an idler gear supported on said member for driving engagement with said drive gear selectively in either direction upon displacement of said cam follower by said cam surface and the corresponding displacement of said member upon the tuning shaft rotation in the corresponding direction.

7. A television tuner as claimed in claim 3, in which said mechanism further includes gearing for coupling said tuning shaft and said drive gear means to controllably rotate said control gear and thereby operate said slug gear to preset the positioned channel coil tuning, said gearing comprising a drive gear secured concentrically to said tuning shaft and an idler gear supported on said plate for driving engagement with said drive gear selectively in either rotational direction upon displacement of said cam follower by said cam surface and the corresponding pivoting of said plate upon the tuning shaft rotation in the corresponding direction, said idler gear being arranged to thereby directly and selectively rotate said control gear through the external manual turning of said tuning shaft.

8. A television tuner as claimed in claim 4, in which said mechanism further includes gearing for coupling said tuning shaft and said control pinion to controllably rotate said control pinion and thereby operate said slug gear to preset the positioned channel coil tuning, said gearing comprising a drive gear operated by said tuning shaft and an idler gear supported on said bracket for driving engagement with said drive gear selectively in either direction upon displacement of said cam follower by said cam surface and the corresponding displacement of said bracket upon the tuning shaft rotation in the corresponding direction, said idler gear being arranged to thereby selectively rotate said control pinion through the external manual turning of said tuning shaft.

9. A television tuner as claimed in claim 4, in which said mechanism further includes gearing for coupling said tuning shaft and control pinion to controllably rotate said control pinion and thereby operate said slug gear to preset the positioned channel coil tuning, said gearing comprising a drive gear secured concentrically to said tuning shaft and an idler gear supported on said bracket for driving engagement with said drive gear selectively in either rotational direction upon displacement of said cam follower by said cam surface and the corresponding displacement of said bracket upon the tuning shaft rotation in the corresponding direction, said idler gear being arranged to thereby directly and selectively rotate said control pinion through the external turning of said preset tuning shaft, and an additional gear connected to said control pinion and carried in engagement with said idler gear.

10. A television tuner as claimed in claim 2, in which said cam has a substantially V-shaped form in coaction with said cam follower, with the apex thereof arranged more remote radially than its side cam portions, said side cam portions being oriented normally to the tuning shaft to displace said cam follower radially, inwardly upon the tuning shaft rotation in either direction.

11. A television tuner as claimed in claim 5, in which said cam has a substantially V-shaped form in coaction with said cam follower, with the apex thereof arranged more remote radially than its side cam portions, said side cam portions being oriented to displace said cam follower radially inwardly upon the tuning shaft rotation in either direction to thereby effect the driving engagement of said drive and idler gears for controllably operating said drive means.

12. A television tuner as claimed in claim 6, in which said cam has a substantially V-shaped form in coaction with said cam follower, with the apex thereof arranged more remote radially than its side cam portions, said side cam portions being oriented normally to the tuning shaft to displace said cam follower radially inwardly upon the tuning shaft rotation in either direction to thereby effect the driving engagement of said drive and idler gears for controllably operating said drive gear means and further to bring said drive gear means into operative engagement with the positioned slug gear means for presetting the corresponding channel coil tuning.

13. A television tuner as claimed in claim 7, in which said cam has a substantially V-shaped form in coaction with said cam follower, with the apex thereof arranged more remote radially than its side cam portions, said side cam portions being oriented normally to the tuning shaft to displace said cam follower radially inwardly upon the tuning shaft rotation in either direction to thereby effect the driving engagement of said drive and idler gears for controllably operating said control gear.

14. A television tuner as claimed in claim 8, in which said cam has a substantially V-shaped form in coaction with said cam follower, with the apex thereof arranged more remote radially than its side cam portions, said side cam portions being oriented normally to the tuning shaft to displace said cam follower radially, inwardly upon the tuning shaft rotation in either direction to thereby effect the driving engagement of said drive and idler gears for controllably operating said control pinion and further to bring said control pinion into operative engagement with the positioned slug gear for presetting the corresponding channel coil tuning.

15. A television tuner, comprising a channel selector switch; an operating shaft for the switch; circuitry for each channel, including a coil and an axially adjustable tuning core; means for axially adjusting the position of the core; a fine-tune assembly including a pinion to drive the core adjusting means, and an actuating gear on a common shaft with said pinion, and a plate for supporting said common shaft, said plate being normally radially spaced from the axis of the switch-operating shaft; a preset fine-tuning shaft concentric with the operating shaft for the switch; a drive gear on said fine-tuning shaft for driving the actuating gear of the fine-tune assembly; and means supported and driven by the fine-tuning shaft for first frictionally engaging and shifting the supporting plate of the fine-tuning assembly radially to a position at which the drive gear on the fine-tuning shaft is meshed on the actuating gear of the fine-tune assembly, after which the fine-tune shaft can operate the actuating gear to drive the pinion to adjust the position of the core to achieve desired fine tuning.

16. A television tuner comprising a channel selector switch; an operating shaft therefor; a tuning circuit for each channel and including an individual tuning slug and a position adjusting gear therefor; a tuning assembly including a pivoted supporting plate carrying a driven gear coaxially mounted on a shaft to drive an adjusting drive pinion to engage and operate the position adjusting gear for the tuning slug of a tuning circuit selected by the channel selector switch; bias means normally biasing the pivoted supporting plate and tuning assembly to non-operating position with the adjusting drive pinion out of engagement with the position adjusting slug gear of the selected channel; a fine-tune shaft; and means on, and controlled by, rotation of said fine-tune shaft for first laterally shifting the pivoted supporting plate and the tuning assembly to mesh the drive pinion with the slug gear, and for then tuning said driven gear on said supporting plate to turn the drive pinion and rotate the slug gear.

17. A television tuner comprising a channel selector switch; tuning circuits for the several respective channels; an operating shaft for said switch and operable to select a desired channel circuit and to render said circuit operative for tuning to the related frequency; an adjustable tuning slug for each tuning circuit, each such slug having a gear for adjustably positioning the slug; a hollow fine-tune shaft concentrically supported on the switch operating shaft; and means for mechanically coupling the fine-tune shaft to the slug gear of a selected tuning circuit for imparting rotation to the slug gear from said fine-tune shaft, said coupling means including a movable pivoted support plate, a shaft supported thereon with a driven gear at one end and a driving pinion at the other end for transmitting motion from the fine-tune shaft to the slug gear, means normally biasing said pivoted support plate to a neutral position at which said driving pinion and said slug gear are disengaged, friction clutch means operable by the fine-tune shaft to shift said pivoted support plate to operating position at which said driving pinion is moved into mesh with said slug gear, after which said friction clutch means permits relative lost-motion movement between said fine-tune shaft and said pivoted support plate, and gear means on said fine-tune shaft for driving said driven gear on said pivoted support plate to rotate said pinion and the slug gear meshed therewith.

18. A television tuner as claimed in claim 1, in which said cam has a substantially V-shaped form in coaction with said cam follower, with the apex thereof arranged more remote radially than its side cam portions, said side cam portions being oriented to displace said cam follower radially inwardly upon the tuning shaft rotation in either direction.

References Cited by the Examiner

UNITED STATES PATENTS

| | | | |
|---|---|---|---|
| 2,981,838 | 4/1961 | Poskozim | 334—51 |
| 3,022,674 | 2/1962 | Cross et al. | 334—51 |
| 3,058,075 | 10/1962 | Polley | 334—51 |
| 3,069,638 | 12/1962 | Undeman et al. | 334—51 |
| 3,069,639 | 12/1962 | Cappelle et al. | 334—51 |

References Cited by the Applicant

UNITED STATES PATENTS

| | | |
|---|---|---|
| 2,802,946 | 8/1957 | Feigl. |
| 2,839,936 | 6/1958 | Dawson. |
| 2,954,469 | 9/1960 | Gelzer. |
| 2,981,838 | 4/1961 | Poskozim. |
| 3,022,674 | 2/1962 | Cross et al. |
| 3,058,075 | 10/1962 | Polley. |
| 3,069,639 | 10/1962 | Cappelle et al. |

FOREIGN PATENTS

| | | |
|---|---|---|
| 1,055,621 | 4/1959 | Germany. |

HERMAN KARL SAALBACH, *Primary Examiner.*

Disclaimer 3,218,589.—*William G. Delp*, Pasadena, Calif. FINE TUNING MECHANISM FOR TELEVISION TUNERS. Patent dated Nov. 16, 1965. Disclaimer filed July 7, 1969, by the assignee, *Standard Kollsman Industries, Inc.*

Hereby enters this disclaimer to claim 16 of said patent.

[*Official Gazette November 24, 1970.*]